(12) United States Patent
Yould et al.

(10) Patent No.: US 11,695,810 B2
(45) Date of Patent: Jul. 4, 2023

(54) ENHANCED CONTENT SHARING PLATFORM

(71) Applicant: Discovered, Santa Cruz, CA (US)

(72) Inventors: Kenneth David Yould, Aptos, CA (US); Charles Pankey, Denver, CO (US)

(73) Assignee: Discovered, Santa Cruz, CA (US)

( * ) Notice: Subject to any disclaimer, the term of this patent is extended or adjusted under 35 U.S.C. 154(b) by 0 days.

(21) Appl. No.: 16/792,662

(22) Filed: Feb. 17, 2020

(65) Prior Publication Data

US 2020/0267191 A1    Aug. 20, 2020

Related U.S. Application Data

(60) Provisional application No. 62/806,541, filed on Feb. 15, 2019.

(51) Int. Cl.
| | | |
|---|---|---|
| *H04L 29/06* | (2006.01) | |
| *G06F 3/0482* | (2013.01) | |
| *G06F 3/14* | (2006.01) | |
| *H04L 65/1089* | (2022.01) | |

(52) U.S. Cl.
CPC ........ *H04L 65/1089* (2013.01); *G06F 3/0482* (2013.01); *G06F 3/1454* (2013.01)

(58) Field of Classification Search
CPC ... G06F 3/0482; G06F 3/1454; H04L 65/1089
See application file for complete search history.

(56) References Cited

U.S. PATENT DOCUMENTS

| | | | | |
|---|---|---|---|---|
| 2009/0007018 A1* | 1/2009 | Ikeda | ............ | G06F 16/54 |
| | | | | 715/838 |
| 2009/0019375 A1* | 1/2009 | Garofalo | ............ | A63F 13/213 |
| | | | | 715/753 |
| 2012/0166979 A1* | 6/2012 | Lewontin | ............ | G06F 16/957 |
| | | | | 715/762 |

(Continued)

FOREIGN PATENT DOCUMENTS

WO    2009003097    12/2008

OTHER PUBLICATIONS

PCT International Search Report and Written Opinion in PCT/US2020/018504, dated May 20, 2020, 10 pages.

*Primary Examiner* — Abdullahi E Salad

(57) ABSTRACT

Examples of the present disclosure describe an enhanced content sharing platform. In aspects, the enhanced content sharing platform provides an interface enabling users to search for and navigate content. The interface may comprise various interface elements for searching, navigating, and/or interacting with content accessible to the enhanced content sharing platform. At least one of the interface elements may be a mode selection interface element. The mode selection interface element may be configured to select and toggle between various content domains available to the enhanced content sharing platform. Each content domain may be associated with a corresponding set of interface elements, and may meaningfully limit content search results to the content domain in which the content was searched. Additionally, new and/or subsequent content searches may be executed in the current selected content domain without requiring a manual (re)selection of that content domain.

20 Claims, 6 Drawing Sheets

(56) References Cited

U.S. PATENT DOCUMENTS

| | | | |
|---|---|---|---|
| 2013/0232148 A1* | 9/2013 | MacDonald | G06F 16/954 |
| | | | 707/740 |
| 2014/0149941 A1* | 5/2014 | Ikeda | G06F 3/0482 |
| | | | 715/838 |
| 2014/0195976 A1 | 7/2014 | Ow et al. | |
| 2014/0310348 A1* | 10/2014 | Keskitalo | H04L 65/4046 |
| | | | 709/204 |
| 2015/0193549 A1* | 7/2015 | Frye | G06F 16/955 |
| | | | 715/739 |
| 2017/0134816 A1* | 5/2017 | Sansom | H04L 65/1059 |
| 2017/0345061 A1* | 11/2017 | Eidelson | G06F 16/9535 |
| 2018/0039698 A1* | 2/2018 | Lewis | G06F 16/955 |
| 2018/0192247 A1* | 7/2018 | Gomes | H04W 4/023 |
| 2018/0314762 A1* | 11/2018 | Rathod | G06F 16/9566 |
| 2019/0042226 A1* | 2/2019 | Zheng | G06F 8/60 |
| 2019/0214024 A1* | 7/2019 | Gruber | G06F 3/167 |
| 2020/0228424 A1* | 7/2020 | Reilly | H04L 43/028 |

* cited by examiner

ENHANCED CONTENT SHARING PLATFORM

CROSS-REFERENCE TO RELATED APPLICATIONS

This application claims the benefit of U.S. Provisional Application Ser. No. 62/806,541, filed Feb. 15, 2019, entitled "ENHANCED CONTENT SHARING PLATFORM," which application is incorporated herein by reference in its entirety.

BACKGROUND

Multiple content sharing platforms have evolved over the years. These platforms enable content generators and content distributors to promote content of various media formats to an online audience using various media channels. As the library of content provided by content sharing platforms has continued to expand, the ability of the online audience to efficaciously search and interact with the content provided by the platforms has often been negatively impacted. As a result, the user experience for, and the utility of, these platforms has been severely degraded.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe an enhanced content sharing platform. In aspects, the enhanced content sharing platform provides an interface enabling users to search for and navigate content. The interface may comprise various interface elements for searching, navigating, and/or interacting with content accessible to the enhanced content sharing platform. At least one of the interface elements may be a mode selection interface element. The mode selection interface element may be configured to select and toggle between various content domains available to the enhanced content sharing platform. Each content domain may be associated with a corresponding set of interface elements, and may meaningfully limit content search results to the content domain in which the content was searched. Additionally, new and/or subsequent content searches may be executed in the current selected content domain without requiring a manual (re)selection of that content domain.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
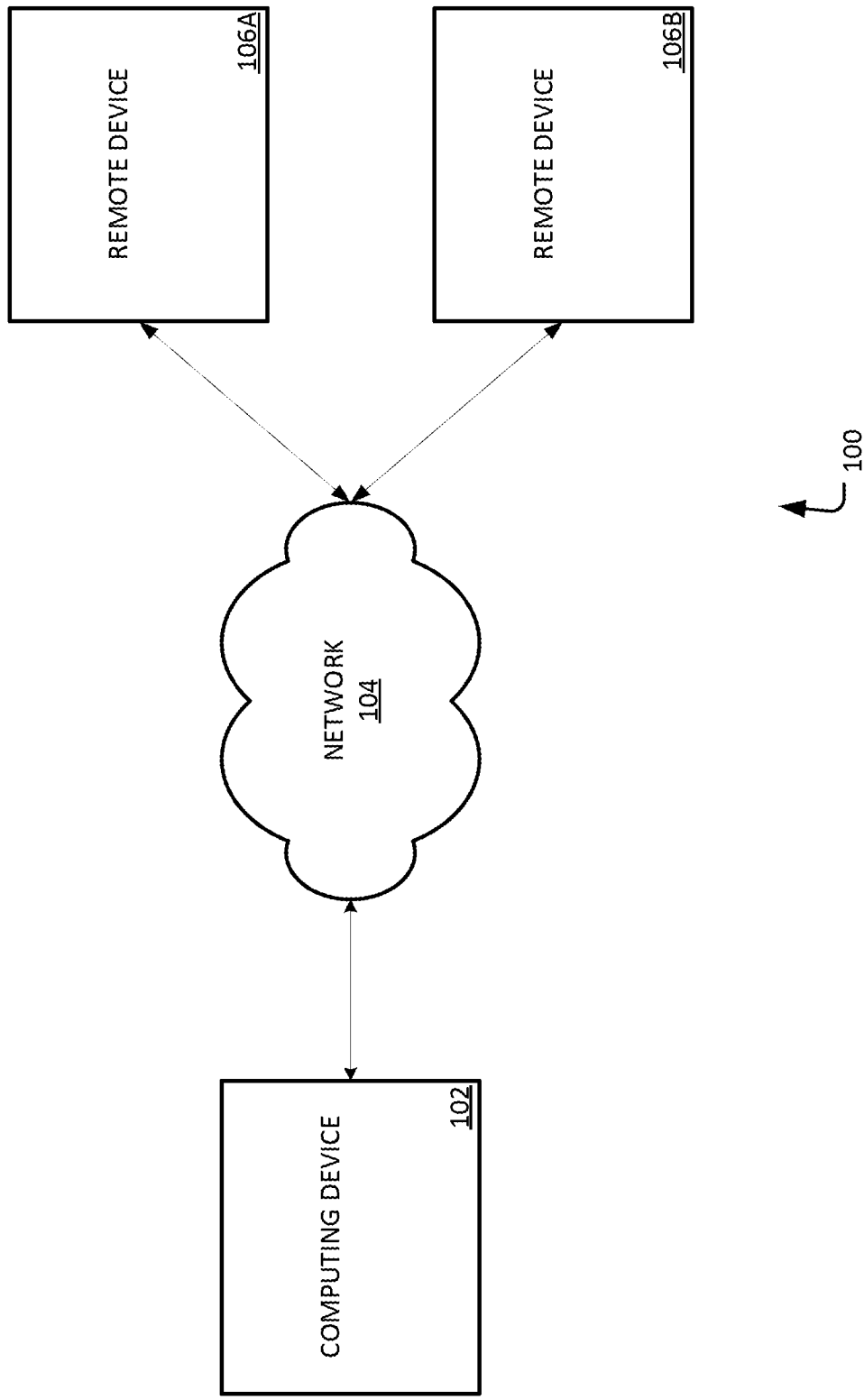
FIG. 1 illustrates an overview of an example system for implementing the enhanced content sharing platform, as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Given the ubiquity of consumer devices and the ever-increasing accessibility of content generation programs and services available to those consumer devices, vast amounts of content is generated each day. Although much of the content generated is for private use, a significant portion of the content generated is made available for public consumption using various content sharing platforms. While many content sharing platforms have evolved utilities for sifting through the petabytes of accessible data, such utilities are generally insufficient to enable users to efficaciously identify new and/or interesting content. Instead, these utilities require users to enter search queries including the exact names of the content/files sought, or to repeatedly refine their search queries and/or filter options until a result set of acceptable size and content is produced. Moreover, even if users are eventually successful in identifying interesting content, this cumbersome search process must be repeated for all subsequent content queries. As a particular example, a user may execute a first search request for songs by the artist Prince. In response to the search request, search results comprising varies content domains/categories may be retrieved. For instance, the search results may comprise music files, music videos, interview videos, news articles, biographical information, merchandise offers, and other content specifically or generally related to the artist Prince, or even related to the term "prince." In order to limit the search results to a reasonable size, the user may apply one or more filters, refine the terms in the search request, and execute the refined search request. This process may be repeated several times before the user finally receives the desired result set. Subsequently, in the same user session, the user may execute a second search request for quotes by the artist Prince. Once again, the search results may comprise varies content domains/categories, and the user may be forced to wade through a vast quantity of results.

With the above-described shortcomings of conventional content sharing platforms in mind, the present disclosure describes systems and methods for implementing an enhanced content sharing platform. In aspects, the enhanced content sharing platform may provide an interface enabling users to quickly and intelligently search for and navigate content in various content domains. A content domain, as used herein, may refer to a category, topic, or genre of content. The interface may include interface elements, such as input controls, navigational components, informational components, and the like. In particular aspects, the interface may additionally include a mode selection interface element. The mode selection interface element may be configured to select and toggle between various content domains available to the enhanced content sharing platform. A non-inclusive list of example content domains may include music, movies, television, news, mail, social media, shopping, games, and sports.

In aspects, one or more content domains may be associated with a corresponding set of interface elements, functionality and/or set of data. For example, when a content domain is selected from the interface, a content domain-specific interface comprising interface elements relevant to the selected content domain may be presented. Additionally, the realm of searchable/accessible content for the content domain-specific interface may be limited to the selected content domain, such that the same query may provide different results when executed in different content domains. In particular aspects, a selected (or default) content domain may remain active until a separate domain is selected. For example, a current content domain may remain active when a user inputs a new search query or navigates to the home page of the enhanced content sharing platform.

Accordingly, the present disclosure provides a plurality of technical benefits including but not limited to: increasing the accuracy of result sets; decreasing the size of relevant result sets and client-side cache data; decreasing the amount of time required to identify desired content; decreasing the computing resources required to generate/present result sets by limiting the searched data set to a selected content domain; generating and providing content domain-specific interfaces; providing an efficient utility for toggling between content domains and content domain-specific interfaces; and maintaining a content domain context during various operations and page navigations, among other examples.

FIG. 1 illustrates an overview of an example system for implementing the enhanced content sharing platform as described herein. Example system 100, as presented, is a combination of interdependent components that interact to form an integrated whole for implementing an enhanced content sharing platform. Components of the system may be hardware components (e.g., used to execute/run operating system (OS)) or software components (e.g., applications, application programming interfaces (APIs), modules, virtual machines, runtime libraries, etc.) implemented on, and/or executed by, hardware components of the system. In one example, system 100 may provide an environment for software components to run, apply execution constraints, and utilize resources or facilities of system 100. For instance, software may be executed on a processing device such as a personal computer (PC), mobile device (e.g., smartphone/phone, tablet, laptop, personal digital assistant (PDA), etc.), and/or any other electronic devices. As an example of a processing device operating environment, refer to the example operating environment depicted in FIG. 6. In other examples, the components of systems disclosed herein may be distributed across multiple devices. For instance, input may be entered on a client device and information may be processed or accessed using other devices in a network, such as one or more server devices.

In aspects, system 100 may comprise computing device 102, distributed network 104, and remote devices 106A and 106B. One of skill in the art will appreciate that the scale of systems such as system 100 may vary and may include more or fewer components than those described in FIG. 1. In system 100, computing device 102 may be comprise, or have access to, a web browsing application and/or one or more content sharing utilities. For example, computing device 102 may include, or have access to, an enhanced content sharing platform. The enhanced content sharing platform may comprise, or have access to, one or more content generation and/or content sharing applications or services. Alternately, the enhanced content sharing platform may be located on one or more remote devices, such as remote devices 106A and 106B. In such an example, computing device 102 may use a locally installed web browser or similar network navigation utility to access the enhanced content sharing platform over distributed network 104. When accessed by computing device 102, the enhanced content sharing platform may provide an interface enabling users to search, upload, download, and otherwise interact with generated content.

Figure 2:
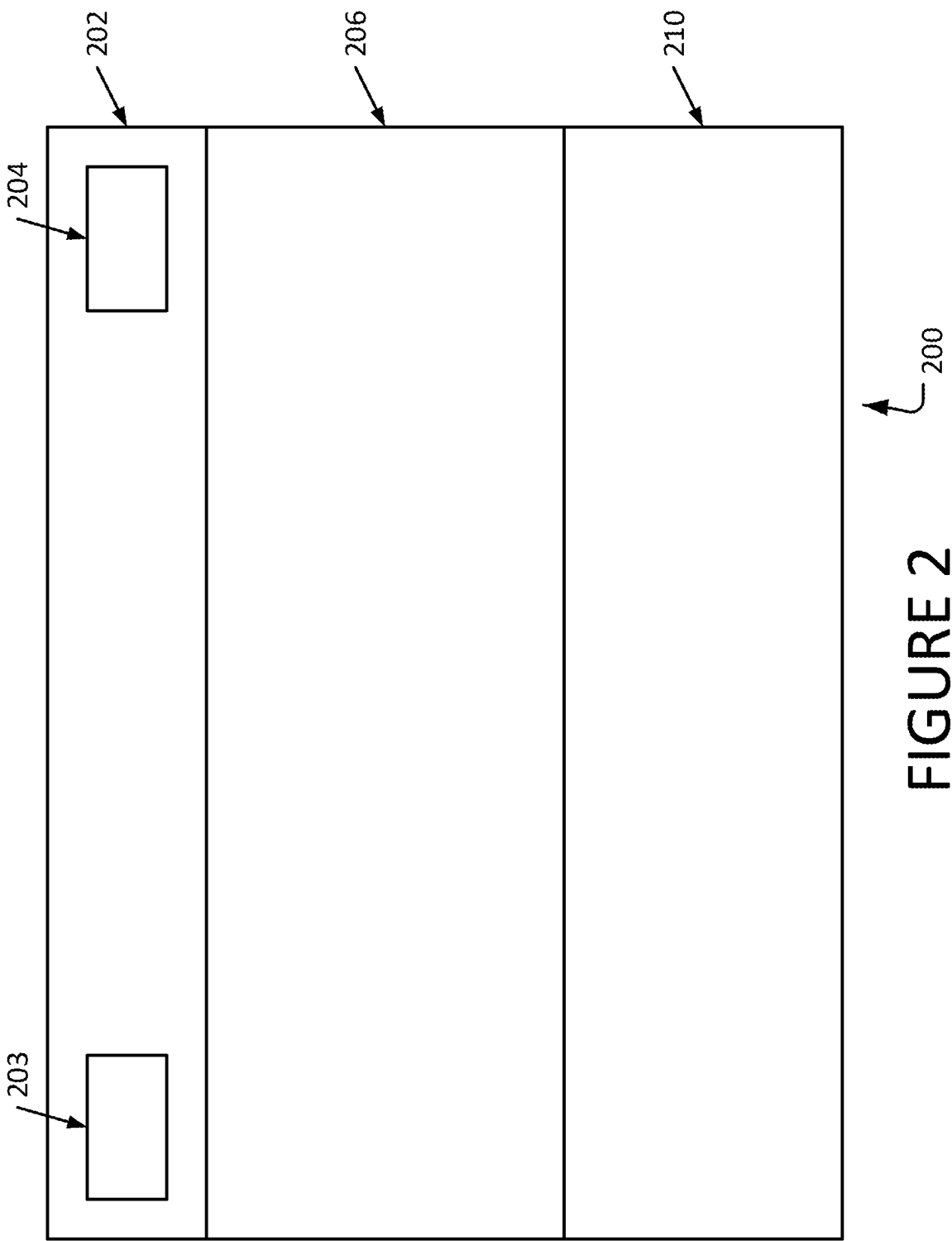
FIG. 2 illustrates an example interface for the enhanced content sharing platform, as described herein.

FIG. 2 is an example interface for the enhanced content sharing platform described herein. In aspects, example interface 200 may be a graphical user interface (GUI) comprising various GUI elements, such as menu bar 202, multimedia playback section 206, and content section 210. Menu bar 202 may comprise, at least, mode selection control 203 and browse icon 204. Mode selection control 203 may be a selectable control configured to toggle between various content domains (e.g., modes) available to the enhanced content sharing platform. In examples, each content domain may be associated with a corresponding interface (e.g., webpage, website, etc.) and/or a set of interface elements. For instance, a 'Music' content domain may correspond to a 'Music' interface comprising a set of music-related interface elements; whereas, a 'Movies' content domain may correspond to a 'Movies' interface comprising a set of movie-related interface elements. Additionally, each content domain may be associated with a respective set of content or data that is used primarily (or exclusively) within that content domain. For instance, a 'Music' content domain may be associated with content and data identified as belonging to the category 'Music.' The identification may refer to an indication of the content domain in the metadata of the content/data, or an indication of the content domain that is added to the content/data itself. In some aspects, when a content domain is active (e.g., has been selected), the content domain will remain active until the current user session is terminated or a different content domain is selected. For example, if the 'Music' content domain has been activated during a current (or previous) user session, all queries and operations will be performed in the context of the 'Music' content domain until mode selection control 203 is used to select a different content domain.

Browse icon 204 may be a selectable control configured to display and enable the selection of various (sub)sections or (sub)categories of a selected content domain. In examples, when a (sub)section or (sub)category provided by browse icon 204 is selected, the corresponding portion of interface 200 may be displayed or a separate interface associated with the selected content domain may be displayed. Multimedia playback section 206 may be configured to playback multimedia content related to the selected content domain. In aspects, when the interface for a selected content domain is displayed, multimedia playback section 206 may begin the playback of a preselected list of media content related to the selected content domain. Additionally, one or more interface elements displayed on the interface may be used to playback media content using the multimedia playback section 206. Content section 210 may be configured to display content associated with the selected content domain. The content may include data related to the various (sub)sections or (sub)categories of a selected content domain. As a specific example, if the 'Music' content domain is activated, content section 210 may display content related to various music genres, music contributors (e.g., artists, producers, managers, directors, etc.), music chart information, music and music video files, etc. In aspects, content section 210 may extend below the viewable portions of interface 200, such that scrolling (or a similar navigational operation) may expose an additional portion of content section 210.

Figure 3:
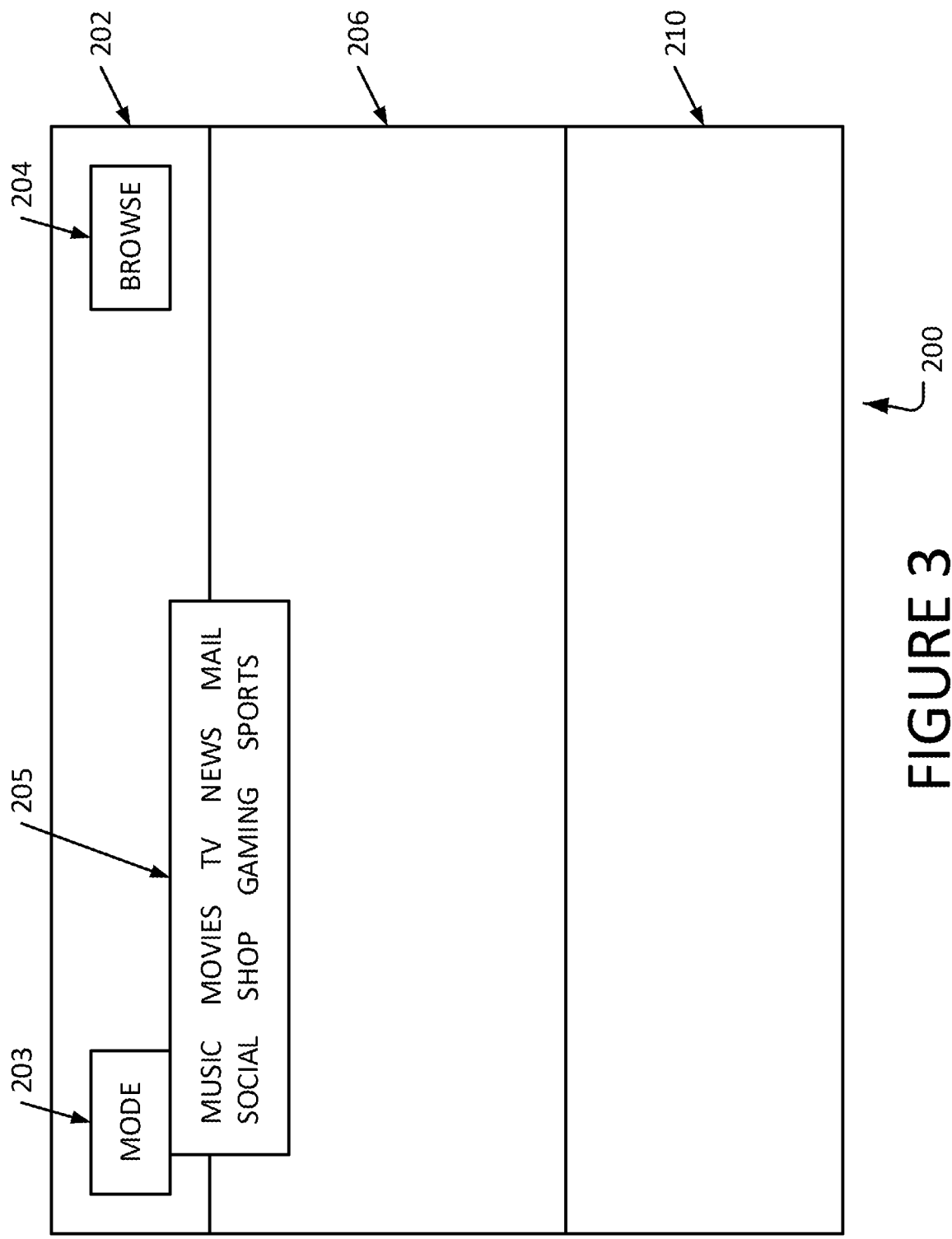
FIG. 3 illustrates an example interface illustrating the content domains available via the mode selection interface element, as described herein.

FIG. 3 illustrates example content domains available via the mode selection interface element of interface 200. As shown, in response to interacting with (e.g., selecting, hovering over, etc.) mode selection control 203, mode option control 205 may be displayed. Mode option control 205 may comprise one or more selectable content domains (e.g., modes). In the particular example illustrated, mode option control 205 comprises content domains 'MUSIC,' 'MOVIES,' 'TV,' 'NEWS,' 'MAIL,' 'SOCIAL,' 'SHOP' 'GAMING' and 'SPORTS.' One of skill in the art will appreciate that the number and/or type of content domains displayed by mode option control 205 may vary for those described in FIG. 3.

Figure 4:
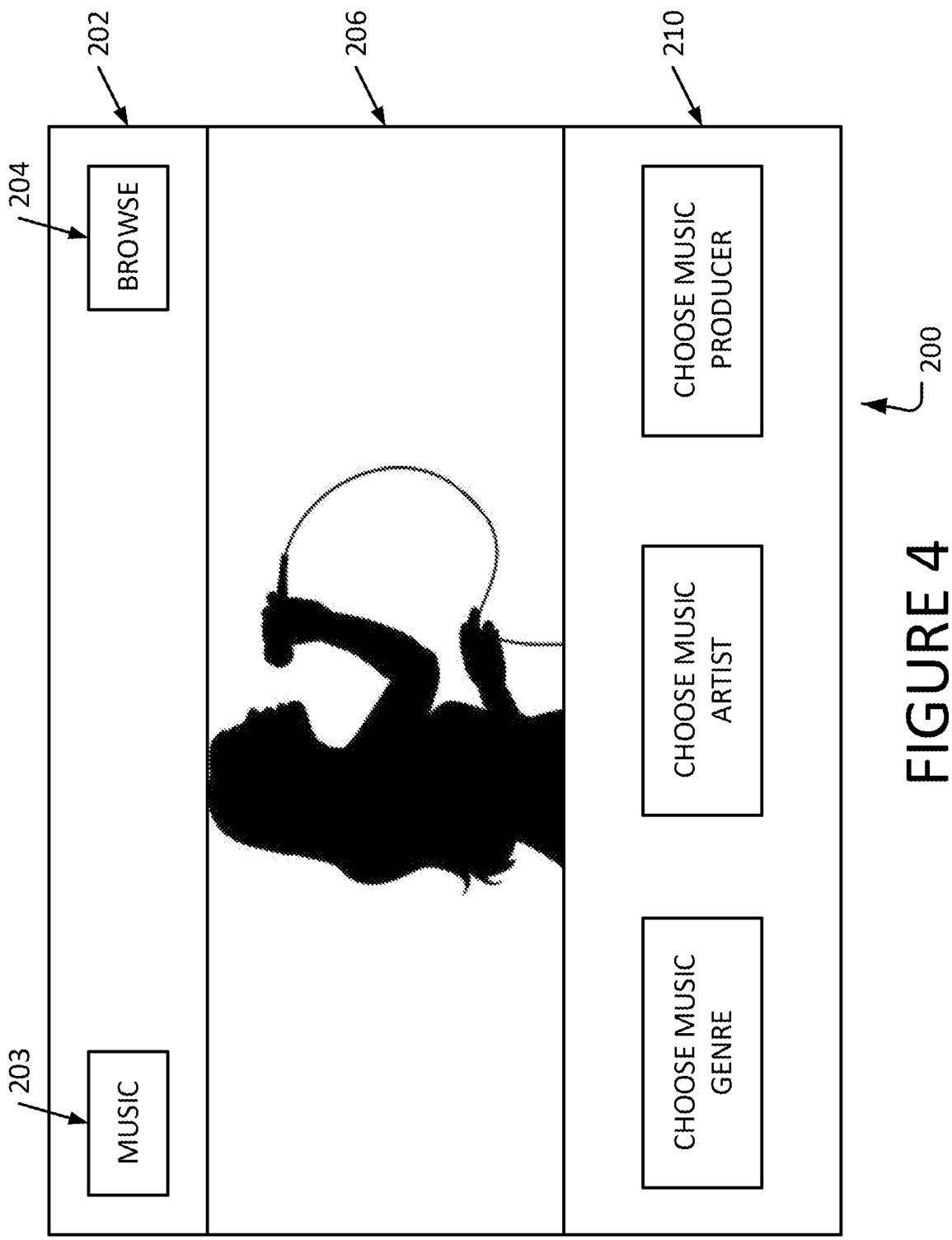
FIG. 4 illustrates an example interface illustrating the content displayed in the various interface sections when a content domain is selected, as described herein.

FIG. 4 illustrates example content displayed in the various interface sections of interface 200 when a content domain is selected. In the example shown, the 'MUSIC' content domains has been selected from mode selection control 203. As a result, the label of mode selection control 203 is updated to indicate the currently selected content domain (e.g., 'MUSIC'). In some aspects, alternate indications of the currently selected content domain may be displayed. For example, the label of the currently selected content domain may be displayed in in the middle of the menu bar 202, the background and/or theme of interface 200 may be altered to reflect the currently selected content domain, etc. As further shown in FIG. 4, as a result of selecting the 'MUSIC' content domain, a music video is being played in multimedia playback section 206. In some aspects, the music video selected for playback may be a default music video used for all users when the 'MUSIC' content domain is selected. In other aspects, the music video selected for playback may be based on individual user settings and/or user feedback. For instance, interface 200 may store (or be associated with) a user profile or user preference data for a particular user. The user profile/preference data may indicate the particular user's preference for one or more music genres, music artists, or music songs/videos. Upon selection of the 'MUSIC' content domain by the user, a music video corresponding to, or indicated by, the user's user profile/preference data may be selected for playback. As further shown in FIG. 4, as a result of selecting the 'MUSIC' content domain, content section 210 may be populated with content specific to the 'MUSIC' content domain. In the particular example illustrated, content section 210 is populated with the selectable controls 'CHOOSE MUSIC GENRE,' 'CHOOSE MUSIC ARTIST,' and 'CHOOSE MUSIC PRODUCER.'

Figure 5:
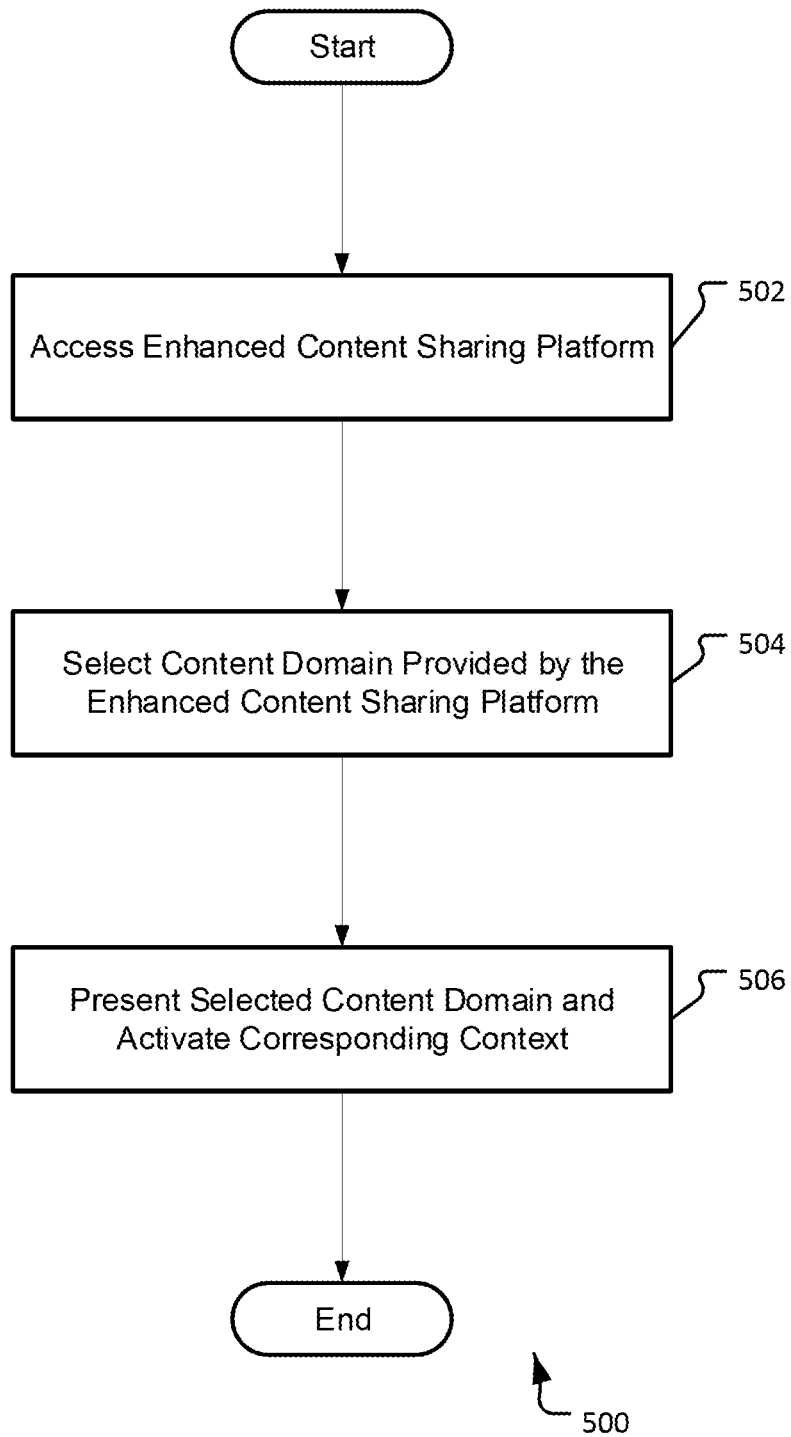
FIG. 5 illustrates an example method for applying a content domain to the enhanced content sharing platform, as described herein.

FIG. 5 illustrates an example method for applying a content domain to the enhanced content sharing platform described herein. Example method 500 begins at operation 502, where a user may access an enhanced content sharing platform. In aspects, a computing device, such as computing device 102, may be used to access an enhanced content sharing platform. The enhanced content sharing platform may be stored and accessed locally from the computing device. Alternately, the enhanced content sharing platform may be stored one or more external devices, such as remote devices 106A and 106B, and accessed from the computing device over a network, such as network 104. In some aspects, upon accessing the enhanced content sharing platform, the enhanced content sharing platform may display content for a default, randomly selected, or preselected content domain. For example, the enhanced content sharing platform may load and display a content domain that was active when the user terminated a previous user session. As another example, the enhanced content sharing platform may use one or more analysis techniques to determine the content domain in which a user has historically spent the most time. For instance, the enhanced content sharing platform may apply one or more machine learning techniques to historical user session data, web transaction logs, website event files, or the like. The machine learning techniques may be used to identify user preferences, behavioral trends, situational contexts, etc. Based on the output of the machine learning techniques, a domain may be selected as the active content domain. As yet another example, the enhanced content sharing platform may use information from a user profile, configuration settings, set of preferences, or user feedback to select a content domain to load/display.

At operation 504, a content domain may be selected by the user. In aspects, the enhanced content sharing platform may provide an interface, such as interface 200, for enabling users to quickly and intelligently search for and navigate content in various content domains provided by (or accessible to) the enhanced content sharing platform. The interface may include a mode selection interface element, such as mode selection control 203, configured to select and toggle between various content domains. In examples, each content domain may be associated with a corresponding interface (e.g., webpage, website, popup menu, etc.) and/or a set of interface elements. Additionally, each content domain may be associated with a respective set of content or data that is used primarily (or exclusively) within that content domain. As a particular example, the content provided by the enhanced content sharing platform may be stored in one or more related databases. The content in the database(s) may be segmented into one or more tables. Each table may represent a content domain, category, or aspects thereof. The tables corresponding to a particular content domain may be accessed when that content domain is selected, for example, using mode selection interface element. For instance, when the 'Music' content domain is selected using the mode selection interface element, the database and/or tables corresponding to the 'Music' content domain may be selected/queried.

At operation 506, the selected content domain may be presented. In aspects, in response to the selection of a content domain, a corresponding interface and/or a set of interface elements may be presented. The interface may comprise a background, a theme, styles and/or content specific to the selected content domain. As a particular example, if a 'MUSIC' content domain is selected, the interface may present a 'MUSIC' label and various music-related links, a music theme or background may be applied to the interface, and music or a music video may be played by, or displayed on, the interface. In some aspects, the selected content domain may remain active (e.g., selected) until the current user session is terminated or a different content domain is selected. In such aspects, the selected content domain may remain active even when the user navigates away from the selected content domain interface. For instance, the selected content domain may remain active when the user navigates to the homepage of the enhanced content sharing platform, or to an alternate website. Alternately, the selected content domain may remain active when the user activates and interfaces with internal or external APIs or services accessible to the interface. Additionally, when a particular content domain is selected, all operations (e.g., search operations, navigation operations, menu-based operations, etc.) will be performed in the context of the selected content domain. For instance, a user may select the 'MUSIC' content domain and execute a first search within the 'MUSIC' content domain (e.g., in the 'MUSIC' context) for songs by the artist Prince. After receiving results for the search, the user may navigate to the homepage of the enhanced content sharing platform. Upon being directed to the homepage, the user may execute a second search for quotes by the artist Prince. The search may again be performed in the context of the 'MUSIC' content domain. As a result, results for the search may comprise music lyrics (e.g. quotes) by the artist Prince, as opposed to news quotes, book quotes, or price quotes for merchandise related to the artist Prince. Such a result is a significant improvement over conventional content sharing platforms that do not intelligently limit search results to the selected content domain and/or to relevant topics or subject matter within a selected content domain.

Figure 6:
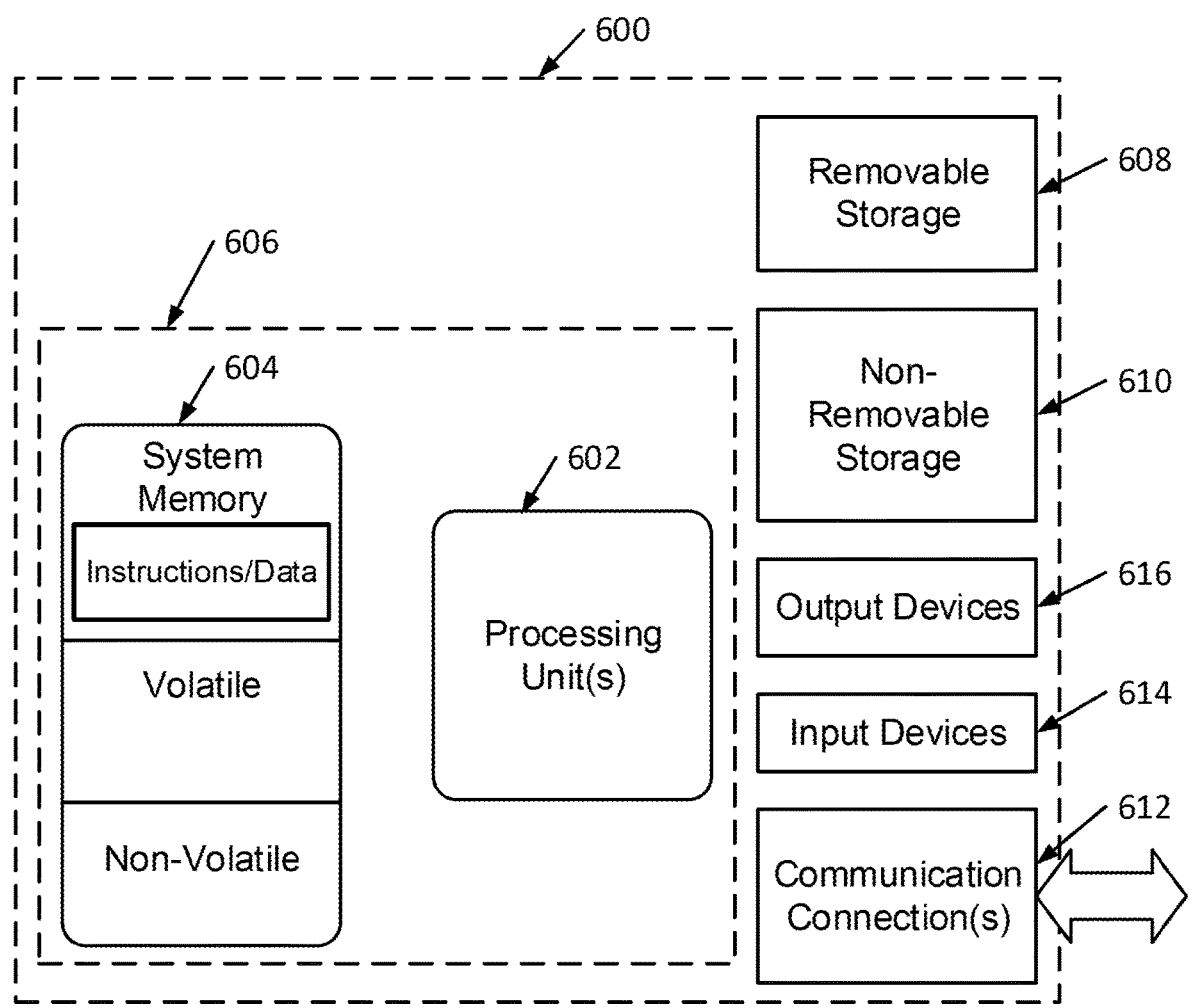
FIG. 6 illustrates one example of a suitable operating environment in which one or more of the present embodiments may be implemented.

FIG. 6 illustrates one example of a suitable operating environment 600 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to the enhanced content sharing platform, and instructions to perform the method(s) disclosed herein) may be volatile (such as RAM), non-volatile (such as ROM, flash memory, etc.), or some combination of the two. This most basic configuration is illustrated by dashed line 606. Further, environment 600 may also include storage devices (e.g., removable storage 608 and/or non-removable storage 610) including, but not limited to, magnetic or optical disks or tape. Similarly, environment 600 may also include input device(s) 614, such as a keyboard, a touchscreen, a mouse, a pen, a microphone, etc., and/or output device(s) 616, such as a display, speakers, a printer, etc. Additionally, the environment may include one or more communication connections 612, such as LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method comprising:
   accessing an enhanced content sharing platform during a current user session, wherein, when the enhanced content sharing platform is accessed, content associated with a previous content domain selected during a previous user session is displayed, and wherein the enhanced content sharing platform comprises a mode toggle control for selecting from a plurality of content domains;
   using the mode toggle control to manually select a first content domain from the plurality of content domains, the first content domain remaining selected until the mode toggle control is used to manually select a second content domain from the plurality of content domains, and wherein queries and operations received after the first content domain has been selected are performed in a context of the first content domain; and
   presenting the first content domain using an interface specific to the first content domain, wherein:
   the interface specific to the first content domain provides:
   a multimedia playback section, wherein video or audio content associated with the first content domain is played in the multimedia playback section when the first content domain is selected; and
   a content section, wherein multimedia content associated with the first content domain is presented in the content section when the first content domain is selected; and
   when the second content domain is manually selected using the mode toggle control, queries and operations received after the second content domain has been selected are performed in a context of the second content domain until the mode toggle control is used to select a different content domain from the plurality of content domains;
   wherein the enhanced content sharing platform is associated with a data set specific to the enhanced content sharing platform, the data set comprising:
   a first data subset used to provide content for the first content domain, the first data subset comprising an indication of the first content domain; and
   a second data subset used to provide content for the second content domain, the second data subset comprising an indication of the second content domain and being different from the first data subset.

2. The system of claim 1, further comprising:
   upon accessing the enhanced content sharing platform, providing a default content domain, wherein the default content domain is selected based on at least one of: a user profile, configuration settings, or user feedback.

3. The system of claim 1, wherein each of the plurality of content domains is associated with a corresponding interface, wherein each corresponding interface being at least one of a webpage, a website, or a popup menu, and each corresponding interface comprising a set of interface elements specific to the corresponding interface.

4. The system of claim 1, wherein each of the plurality of content domains is associated with a set of content domain-specific data corresponding to a respective content domain.

5. The system of claim 1, wherein the interface comprises at least one of:
   a background corresponding to the first content domain;
   a theme corresponding to the first content domain; and
   a set of user interface elements corresponding to the first content domain.

6. The system of claim 1, wherein the first content domain remains selected when:
   a user navigates away from the interface specific to the first content domain; or
   the user interacts with an API or service of the enhanced content sharing platform.

7. The system of claim 1, wherein the first content domain remains selected when:
   a user navigates away from the enhanced content sharing platform; or
   the current user session is terminated.

8. The system of claim 1, wherein:
   when a query is performed in the context of the first content domain, a first set of results is provided; and
   when the query is performed in the context of the second content domain, a second set of results is provided, wherein the first set of results is different from the second set of results.

9. The system of claim 1, wherein the content associated with the previous content domain is selected based, at least in part, on a determination that a user has historically spent the most time in the previous content domain while the user is accessing the enhanced content sharing platform.

10. The system of claim 1, wherein the multimedia playback section automatically begins playback of a preselected list of media content related to the first content domain when the first content domain is selected using the mode toggle control.

11. The system of claim 10, wherein the preselected list of media content is specific to a user and is selected based on user preference data for the user, the user preference data being determined by applying machine learning techniques to user session data for the user.

12. A method comprising:
   accessing, during a current user session, an enhanced content sharing platform, wherein accessing the enhanced content sharing platform causes content associated with a previous content domain selected during a previous user session to be displayed, and wherein the enhanced content sharing platform comprises a mode toggle control for selecting from a plurality of content domains;
   manually selecting, using the mode toggle control, a first content domain from the plurality of content domains, wherein selecting the first content domain comprises applying a first context associated with the first content domain to the enhanced content sharing platform, and wherein queries and operations received after the first content domain has been selected are performed in a context of the first content domain until a second content domain is manually selected using the mode toggle control; and presenting the first content domain using an interface specific to the first content domain, wherein:
the interface specific to the first content domain provides:
a multimedia playback section, wherein video or audio content associated with the first content domain is played in the multimedia playback section when the first content domain is selected; and
a content section, wherein multimedia content associated with the first content domain is presented in the content section when the first content domain is selected; and
when a second content domain is manually selected using the mode toggle control, queries and operations received after the second content domain has been selected are performed in a context of the second content domain while the second content domain remains manually selected;
wherein the enhanced content sharing platform is associated with a data set specific to the enhanced content sharing platform, the data set comprising:
a first data subset used to provide content for the first content domain, the first data subset comprising an indication of the first content domain; and
a second data subset used to provide content for the second content domain, the second data subset comprising an indication of the second content domain and being different from the first data subset.

13. The method of claim 12, wherein, when the enhanced content sharing platform is accessed during the current user session, the enhanced content sharing platform displays content associated with a recommended content domain.

14. The method of claim 13, wherein the recommended content domain is selected based on at least one of: a user profile, user configuration settings, or user feedback.

15. The method of claim 12, wherein the plurality of content domains comprises:
the first content domain; and
the second content domain, the second content domain being associated with an interface specific to the second content domain.

16. The method of claim 15, wherein, when the second content domain is selected:
a second context associated with the second content domain is applied to the enhanced content sharing platform; and
the interface specific to the second content domain is presented.

17. The method of claim 15, wherein the interface specific to the first content domain comprises a first theme associated with the first content domain, and the interface specific to the second content domain comprises a second theme associated with the second content domain.

18. The method of claim 12, wherein the first content domain is associated with a first data store and the second content domain is associated with a second data store.

19. A computer-readable storage device storing computer executable instructions that when executed cause a computing system to perform a method comprising:
accessing, during a current user session, an enhanced content sharing platform, wherein accessing the enhanced content sharing platform causes content associated with a previous content domain selected during a previous user session to be displayed, and wherein the enhanced content sharing platform comprises a mode toggle control for selecting from a plurality of content domains;
manually selecting, using the mode toggle control, a first content domain from the plurality of content domains, wherein selecting the first content domain comprises applying a first context associated with the first content domain to the enhanced content sharing platform, and wherein queries and operations received after the first content domain has been selected are performed in a context of the first content domain until a second content domain is manually selected using the mode toggle control; and
presenting the first content domain using an interface specific to the first content domain, wherein:
the interface specific to the first content domain provides:
a multimedia playback section, wherein video or audio content associated with the first content domain is played in the multimedia playback section when the first content domain is selected; and
a content section, wherein multimedia content associated with the first content domain is presented in the content section when the first content domain is selected; and
when the second content domain is manually selected using the mode toggle control, queries and operations received after the second content domain has been selected are performed in a context of the second content domain while the second content domain remains manually selected;
wherein the enhanced content sharing platform is associated with a data set specific to the enhanced content sharing platform, the data set comprising:
a first data subset used to provide content for the first content domain, the first data subset comprising an indication of the first content domain; and
a second data subset used to provide content for the second content domain, the second data subset comprising an indication of the second content domain and being different from the first data subset.

20. The computer-readable storage device of claim 19, wherein the first content domain remains selected when:
a user navigates away from the interface specific to the first content domain; or
the user interacts with an API or service of the enhanced content sharing platform.

* * * * *